…

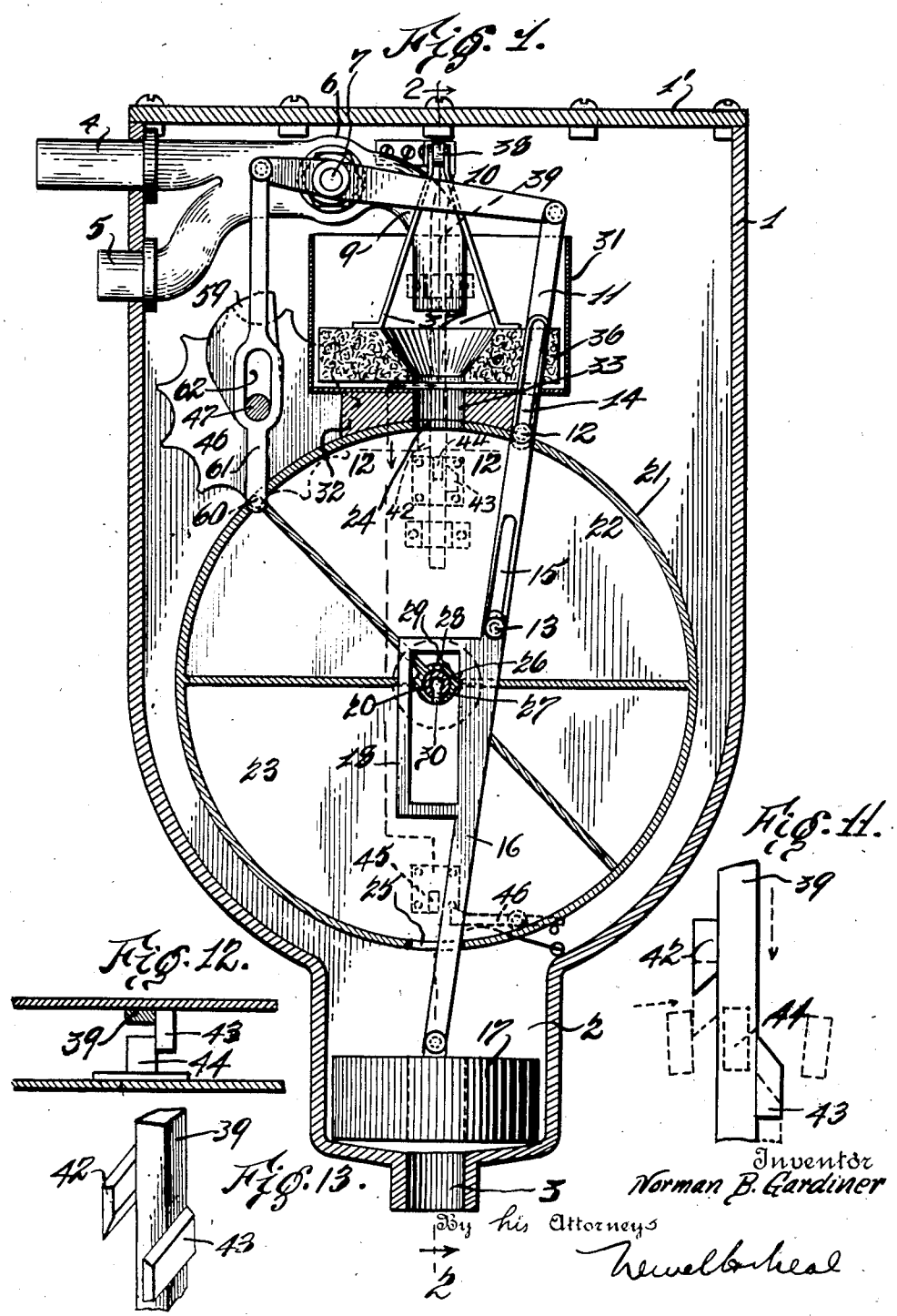

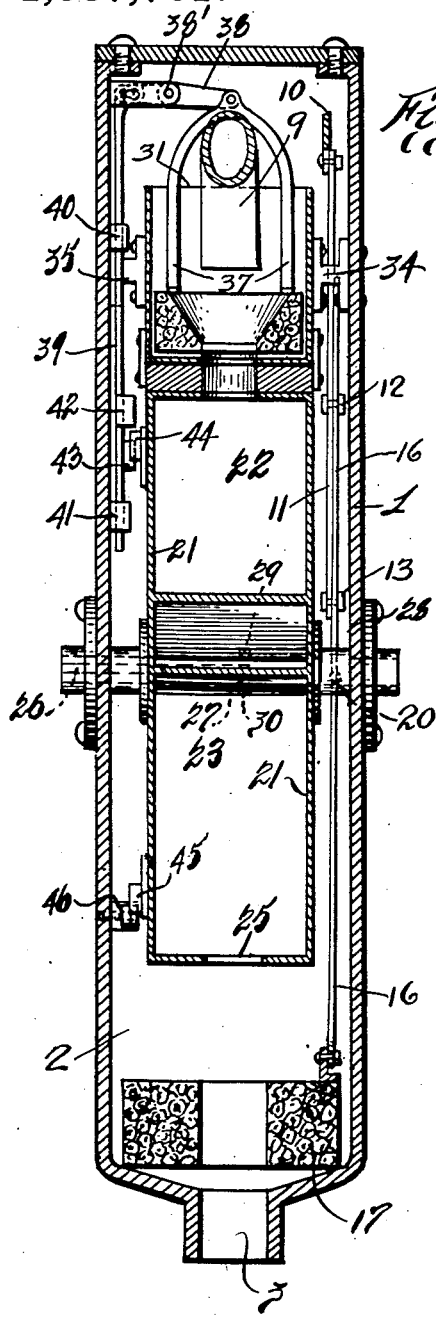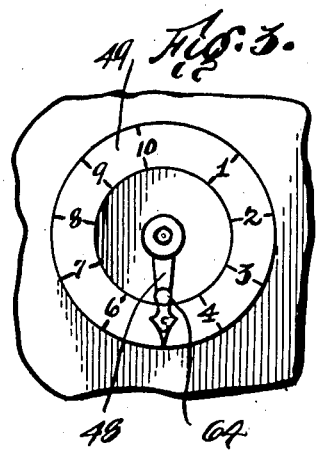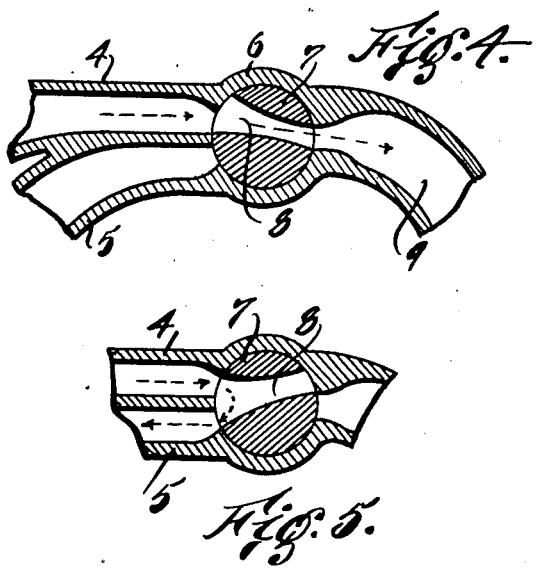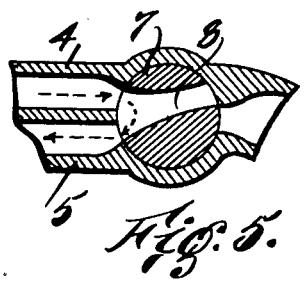

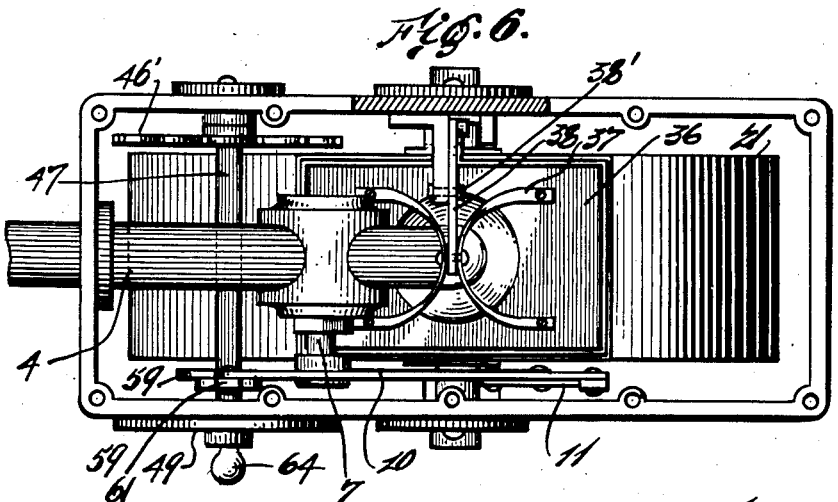
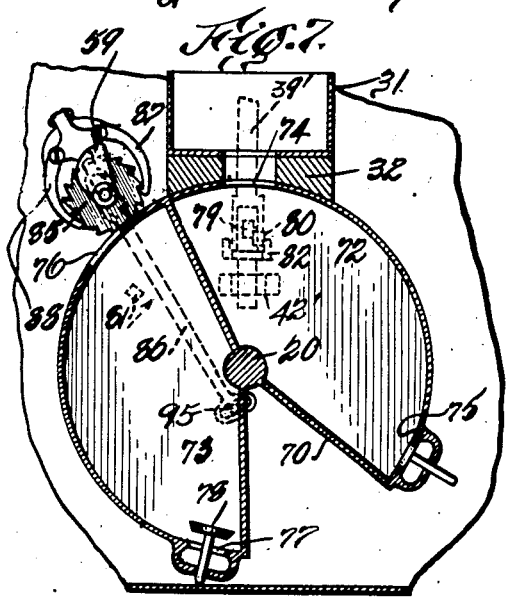
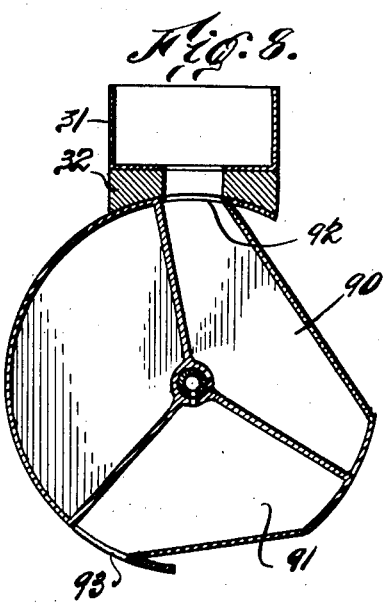
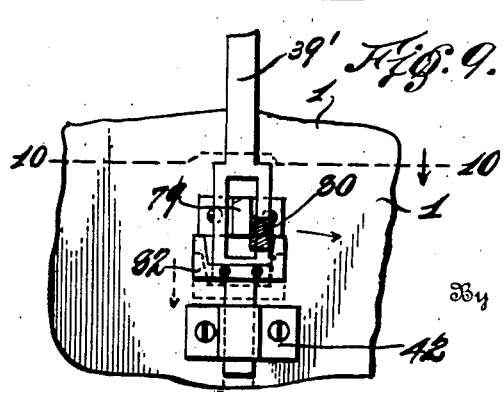
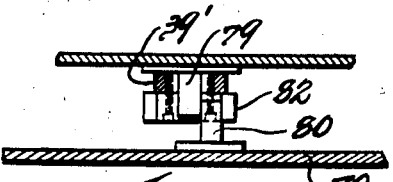

UNITED STATES PATENT OFFICE.

NORMAN B. GARDINER, OF STATEN ISLAND, NEW YORK.

FLUID-MEASURING APPARATUS.

1,387,701.          Specification of Letters Patent.          Patented Aug. 16, 1921.

Application filed December 20, 1916. Serial No. 138,120.

*To all whom it may concern:*

Be it known that I, NORMAN B. GARDINER, a citizen of the United States, residing at Staten Island, borough of Richmond, county and State of New York, have invented certain new and useful Improvements in Fluid-Measuring Apparatus, of which the following is a clear, full, and exact description.

This invention relates to an improvement in apparatus for measuring fluids, and is more particularly adapted for use in connection with pumps or any other source of supply for dispensing gasolene and the like. In devices of this character it is desirable to deliver the gasolene quickly, conveniently and in accurate volumetric quantities, and an object of the present invention therefore is to improve the volumetric efficiency of such an apparatus, and furthermore to give the consumer what is known as a "struck measure" with no chance for inaccuracies due to failure of pumping mechanism to operate properly.

The present apparatus is arranged to be adjusted for delivering predetermined quantities of fluid as may be desired, and a further object of the invention is to render such an apparatus secure against careless handling on the part of the operator so that when once adjusted to deliver a stated quantity of fluid, it will deliver that quantity no more and no less whether the operator keeps on pumping or keeps the supply valves open or not.

A counter is arranged in connection with the apparatus to indicate not how many times the operator turns over a pump handle as in former devices, but the number of times that a full struck measure of fluid is delivered to the consumer, and furthermore should for any reason the discharge of fluid from the apparatus be impeded, the supply of fluid to the apparatus is returned to its source and the counter no longer operates.

In the preferred embodiment of my invention, I employ a measuring container having one or more measuring compartments for receiving fluid from the supply and preferably gravity operated to move from its receiving to its discharging position. A distinguishing feature of this invention over other apparatuses of this kind is that the fluid supplied to the container or compartment thereof at each receiving operation is limited to the exact volumetric capacity of the container or its compartment. Any surplus fluid supplied to the container, instead of being allowed to drip over into the discharge outlet and thereby make the delivery of the apparatus uncertain, is taken care of in an overflow chamber so as to be ready for delivery to the container upon the next succeeding receiving operation. Furthermore, the operation of the container is preferably controlled by the overflow in said overflow chamber so as to insure the filling of said container at least up to its volumetric capacity.

By an apparatus of this kind, the amount of fluid delivered is made absolutely accurate at all times and will not vary with the skillful manipulation of a pump-handle, as is the case in many self-measuring pumps today, nor will the delivered quantity vary with the change in the rate of supply, as is the case with the ordinary type of measuring wheel.

The advantage of giving the consumer a "struck measure" is that he is certain of its accuracy, and with an apparatus of this kind the operation of the measuring container can advantageously be exposed through a glass window in the side of the casing, whereby the consumer can at all times see exactly what he is getting. Further objects and advantages of the invention will become apparent from the following description and the accompanying drawings.

In the preferred embodiment of the invention shown in the drawings, Figure 1 is a longitudinal section through the apparatus;

Fig. 2 is a transverse section along line 2—2 of Fig. 1;

Fig. 3 is a detail of the indicator and dial;

Figs. 4 and 5 are detail sections through the return bypass valve in the supply pipe, showing said valve in two different positions;

Fig. 6 is a top plan view of the apparatus with the cover removed;

Figs. 7 and 8 are views of two different modified forms of a measuring container;

Fig. 9 is a detail of the holding means adapted to be used in connection with an oscillating container such as shown in Figs. 7 or 8;

Fig. 10 is a sectional view of the parts looking downwardly along line 10—10 of Fig. 9;

Fig. 11 is a detail of the holding means used in connection with the apparatus shown in Fig. 1;

Fig. 12 is a detail section looking downwardly along line 12—12 of Fig. 1; and

Fig. 13 is a partial perspective of the holding bar.

Referring more particularly to the drawings, 1 indicates the outside casing provided with a cover 1' at its upper end and a delivery passageway 2 and an outlet 3 also at its lower end. 4 indicates a supply-pipe for conveying fluid to the interior of the casing 1, and it may come from any ordinary source of supply, such as a hand-operated pump or a gravity tank. 5 is a return bypass pipe leading back to the source of supply from the return bypass valve chamber at 6. Within the valve chamber 6, as shown in Figs. 4 and 5, is a suitable three-way valve 7 having a passageway 8 therethrough, which, as shown in Figs. 4 and 5, may open communication between supply-pipe 4 and spout 9 or between supply-pipe 4 and return pipe 5, depending upon which way said valve is turned. A two-armed lever 10 is secured to said valve 7, and one arm of said lever is connected to a link 11, as shown in Fig. 1. Said link 11 has pins 12 and 13 engaging in slots 14 and 15 of a lower link 16, which lower link in turn is connected to a float 17 located within the outlet passageway 2. Link 16 is also provided with a guiding yoke 18 surrounding the shaft 20 of the container. It will be observed that by this construction the upward movement of the float 17 will elevate links 16 and 11 and thereby rock the lever 10, so as to turn the valve 7 from the position shown in Fig. 4 to that shown in Fig. 5, whereby the supply of fluid will be returned to its source. This action takes place whenever the fluid delivered through outlet 3 becomes impeded through any obstruction and thereby tends to back up into passageway 2, causing the float 17 to operate with the result heretofore described.

Rotatably mounted by a bearing sleeve 28 upon a fixed shaft 20 is a measuring container 21, in the present embodiment arranged with two measuring compartments 22 and 23. The compartments are provided with inlet openings 24 and 25 respectively, and it is understood that said inlet openings act alternately to receive and discharge the contents of its compartment during the rotation of the container. The shaft 20, as shown, has a central air vent 26 therethrough and a radial opening 27 communicating therewith, while the tubular bearing 28 of the container 21 also has air vent openings 29 and 30 adapted to register alternately with the air vent 27 and thus admit air into the upper part of each compartment when the same is in its discharging position for facilitating said discharge.

Above the container 21 and supported by brackets 34, 35 on the casing 1 (see Fig. 2) is an overflow chamber 31, and the bottom of said overflow chamber is preferably provided with a block 32 closely fitting at its lower surface upon the peripheral curved surface of container 21. The block 32 has an opening 33 therethrough adapted to register with the inlet 24 of the compartment 22. The spout 9 of the inlet pipe 4 empties into said overflow chamber 31, as shown in Fig. 1, so that the compartments, such as 22, 23 of the container are adapted to receive fluid from the supply through said overflow chamber 31, passageway 33, and their respective inlets. The compartment 22 for instance, as it is filled with fluid tends by gravity to rotate the container 21 for bringing said compartment into discharging position and the other compartment 23 into receiving position. When a compartment in receiving position has become filled to capacity, the fluid backs up through its inlet and passageway 33 into the overflow chamber 31, and this backed up fluid in the overflow chamber acts to release the holding means for the container so as to allow said filled compartment to move to discharging position.

It will be understood that the opening 8, in the valve 7, is of such a size relative to the capacity of the chamber 31, that there is no danger of said chamber overflowing.

Within the overflow chamber 31 is a float member 36 connected by brackets 37 to one end of a lever 38, pivoted upon a bracket 38' fixed to the casing 1, see Fig. 2. The other end of lever 38 is connected to a vertically sliding holding bar 39 movable in guides 40 and 41 upon the casing 1. The holding bar has upper and lower holding lugs 42 and 43 thereon, adapted to stand in the path of stop lug 44 fixed to the adjacent side of the container 21. The container is also provided with a similar stop lug 45 for the other compartment 23. A spring-pressed latch 46 is mounted upon the casing 1 near the lower end for acting as a retaining means against the lowermost stop lug, which, in the illustrated position shown, is 45.

The operation of the container is as follows, assuming the parts to be in the position shown in Fig. 1 and that fluid is being delivered to the container through supply pipe 4. As the fluid fills up compartment 22 and backs up into overflow chamber 31, the float 36 is raised and through lever 38 depresses holding bar 39. Holding lug 43 of said holding bar is thereby moved downwardly from solid to dotted line position shown in Fig. 11, to release stop lug 44 upon the container, whereby the container will be rotated to bring compartment 22 to discharging position and compartment 23 to receiving position. It will be observed that as the compartment 22 moves to its discharging position, the inlet 24 thereof is cut off by the over-lapping surface of block 32. Furthermore, it will be observed that the over-lapping cut-off surface of block 32 is wider than the inlet 24 so as to completely cut off the same before any discharge or spilling over can take place from the filled compartment 22. This action of the block 32 in cutting off the inlet 24 gives a "struck measure" and it insures that the amount of fluid supplied to said compartment is limited to its exact volumetric capacity.

As compartment 22 swings around to discharging position, its momentum carries it far enough to bring stop lug 44 just beyond the front end of latch 46 to thereby hold it in its discharging position. Overthrow movement of the compartment 23 is prevented by the stop lug 45 coming against the holding lug 42, bar 39 being still in its lowered position as shown in dotted lines Fig. 11, due to the fact that the float 36 is still raised by the overflow in the chamber 31. As soon, however, as compartment 23 brings its inlet 25 in position to receive the fluid from the overflow chamber, the float 36 descends and the bar 39 rises to bring holding lug 43 into position in front of the stop lug 44 and thereby hold the compartment 23 in its receiving position until filled for repeating the operation. The weight of the liquid in the compartment 23 prevents the container from rotating backwardly at this stage of the filling operation, although the latch 46 has suspended its function by reason of the forward movement of the stop lug 44 when the container swings to bring the stop lug 45 against the holding lug 43, a position analogous to that shown in Figs. 1 and 11.

In order to indicate the number of receiving and discharging cycles for each compartment, I have provided counting means which comprise a star wheel 46' fixed to a shaft 47, the outer end of which has an indicator pointer 48 working in front of a dial 49 placed upon the outside of the casing 1, as shown in Fig. 3. The star wheel 46 is adapted to be engaged and operated by the lugs 44 and 45, so that each movement of one of said lugs past the star wheel turns said star-wheel the space between two teeth. Fixed to the shaft 47 is a cam 59, see Fig. 6, adapted to engage a pin 60 in the lower end of link 61. The link 61 has a slotted engagement 62 with the shaft 47 and is connected at its upper end to the lever 10. A finger knob 64 upon the pointer 48 enables the shaft 47 to be turned for adjusting said cam 59 in any desired position to operate pin 60, depending upon the number of measured quantities which is desired to be delivered through the apparatus. The dial 49 will indicate the number of quantities to be delivered, and it is understood that when the cam 59 is carried around to depress the pin 60, link 61 is pulled down to operate the valve 7 from the position shown in Fig. 4 to the position shown in Fig. 5, thereby stopping the supply to the container and returning it to its source. In this way the operator can adjust the apparatus to deliver any predetermined quantity of fluid and then either turn on the supply valves (not shown) for the inlet pipe 4, or else begin operating a supply pump (not shown) for said pipe 4, and the device will automatically stop delivering fluid when the predetermined quantity has been delivered. Even if the operator should continue pumping from the supply, no further fluid will be delivered through the apparatus.

In the modifications shown in Figs. 7 and 8, I have illustrated how an oscillating container might be used in connection with the present apparatus. Referring to Fig. 7, 70 is a container pivotally mounted upon the shaft 20 and having compartments 72 and 73. Compartment 72 has inlet 74 and valve-controlled outlet 75, while compartment 73 has an inlet 76 and valve-controlled outlet 77. It is understood that the container will be oscillated by gravity upon the successive filling up of its compartments to alternately bring the said compartments into receiving and discharging positions. When in discharging position, the outlet valve, such as 78, is raised to open its discharge opening, such as 77. A similar overflow chamber 31 and cut-off block 32 is provided as in the modification shown in Fig. 1. The float-operated means is also the same for this modification and need not be shown, but the holding means is changed somewhat to take care of this oscillating form of container.

The holding means is shown in Figs. 9 and 10, and comprises the holding bar 39' movable in a guide 42'. A holding lug 79 is fixed to the side of the casing 1 so as to stand in the path of stop lugs 80 and 81, one for each of the compartments 72 and 73, whereby the container is limited in its oscillations in either direction. In order to hold the container in the position so as to completely fill its receiving compartment, the holding bar 39' is provided near its lower end with a U-shaped holding piece 82 adapted, when said holding bar 39 is raised, to stand behind either lug 80 or 81 and hold it against stop 79, as shown in dotted lines in Fig. 7. Similarly operated float means, as described in connection with Fig. 1, will depress the holding bar 39' and release the container for its movement.

The counting and automatic stop mechanism for the oscillating container is also somewhat changed from that used in the rotary form, and the changes are indicated in Fig. 7. In place of the star wheel 46, ratchet 85 is provided, and a reciprocating pawl-carrier 86 is provided with pawls 87, 88 at each side of said ratchet adapted, when said bar 86 is reciprocated, to feed said ratchet continuously in one direction. The pawl-carrier 86 has a lower slotted end portion engaging with a pin 95 fixed to the container, so as to be reciprocated by said pin during the oscillating movement of the container. Fixed to the ratchet shaft 89 is the cam 59 which will act as described in connection with Fig. 1.

In Fig. 8 the oscillating container is of still a different form, comprising two compartments 90 and 91, each with a single inlet such as 92 and 93. In this form of container, the inlet acts also as a discharge opening, and it is understood that similar holding means and counting means may be employed in connection with this container, as is shown in Fig. 7. The rest of the apparatus for this container will be as shown in Fig. 1. The air vent through the shaft is not necessary in the modification of Fig. 7, due to the separate inlet and discharge openings for each compartment, but is desirable in the modification shown in Fig. 8.

It is apparent that many other various modifications and changes in detail may be made in the invention as shown, without departing from the spirit thereof, and I wish my claims to be interpreted broadly so as to cover all such equivalent forms.

What I claim as new is:—

1. In a fluid measuring apparatus, in combination, a means of fluid supply, a measuring container automatically operated by the fluid itself to receive and discharge fluid, and means coöperating with said fluid supply means for assuring to said container upon each operation thereof a supply of fluid equal to but not exceeding the volumetric capacity of the container.

2. In a fluid measuring apparatus, in combination, a fluid supply, a measuring container movable from a position to receive fluid to a position to discharge the same, means for limiting the supply of fluid to said container upon each movement thereof to the exact volumetric capacity of said container, said limiting means comprising a cut-off device operable by a movement of said container and means actuated by the overflow from said container for releasing the container to effect the operation of said cut-off device.

3. In a fluid measuring apparatus in combination, a fluid supply, a measuring container operating to receive and discharge fluid and having an inlet opening, means for limiting the supply of fluid to said container upon each operation thereof, to the exact volumetric capacity of said container, comprising a cut-off device for overlapping said inlet opening and means for preventing the cut-off device from becoming effective until the container has received a full portion of fluid.

4. In a fluid measuring apparatus in combination, a fluid supply, a measuring container operating to receive and discharge fluid and having an inlet opening, means for limiting the supply of fluid to said container upon each operation thereof, to the exact volumetric capacity of said container, comprising a cut-off device for overlapping said inlet opening, and means actuated by the overflow from said container for effecting the operation of said cut-off device.

5. In a fluid measuring apparatus in combination, a fluid supply, a measuring container operating to receive and discharge fluid, and means for limiting the supply of fluid to said container upon each operation thereof, to the exact volumetric capacity of said container, comprising a cut-off device and an overflow chamber for receiving the overflow from said container.

6. In a fluid measuring apparatus in combination, a fluid supply, a measuring container operating to receive and discharge fluid, means for limiting the supply of fluid to said container upon each operation thereof, to the exact volumetric capacity of said container, comprising a cut-off device and an overflow chamber for receiving the overflow from said container, and float-operated means actuated by the overflow in said chamber for effecting the operation of said cut-off device.

7. In a fluid measuring apparatus in combination, a fluid supply, a measuring container operating to receive and discharge fluid, holding means for preventing the discharge fluid, holding means for preventing the discharging operation of said container, means for limiting the supply of fluid to said container upon each operation thereof, to the exact volumetric capacity of said container, and means actuated by the overflow from said container for releasing said holding means and thereby effecting the discharging operation of said container.

8. In a fluid measuring apparatus in combination, a fluid supply, a measuring container operating to receive and discharge fluid, means for limiting the supply of fluid to said container upon each operation thereof, to the exact volumetric capacity of said container, comprising a cut-off device arranged to cut off the supply to said container before the container begins to discharge, and means actuated by the overflow from said container for effecting the operation of said cut-off device and causing the discharge of said container.

9. In a fluid measuring apparatus in combination, a fluid supply, a measuring container operating to receive and discharge fluid and having an inlet, and means for limiting the supply of fluid to said container upon each operation thereof, to the exact volumetric capacity of said container, comprising a cut-off device arranged to overlap said inlet before the discharging operation of said container and means for preventing the cut-off device from becoming effective until the container has received a full portion of fluid.

10. In a fluid measuring apparatus in combination, a fluid supply, a measuring container operating to receive and discharge fluid and having an inlet, means for limiting the supply of fluid to said container upon each operation thereof, to the exact volumetric capacity of said container, comprising a cut-off device arranged to overlap said inlet before the discharging operation of said container, and means actuated by the overflow from said container for effecting the operation of said cut-off device and causing the discharge of said container.

11. In a fluid measuring apparatus in combination, a fluid supply, a measuring container having an inlet for receiving fluid, said container being movable to a position for discharging its contents, holding means for said container, means for limiting the supply of fluid to said container upon each operation thereof, to the exact volumetric capacity of said container, comprising a cut-off device arranged to overlap said inlet when the container is moved therepast for discharge, an overflow chamber for receiving the overflow from said container, and float-operated means actuated by said overflow for effecting the release of said holding means and thereby permitting the movement of said container to discharging position.

12. In a fluid measuring apparatus, in combination, a fluid supply, a measuring container having an operating movement to receive and discharge fluid, and means for assuring to said container upon each operation thereof a supply of fluid equal to but not exceeding the volumetric capacity of the container, comprising a cut-off device arranged to cut off the supply to the container after the container has received a full portion of liquid and before it begins to discharge, and counter mechanism actuated by the discharging movement of said container to indicate the number of said discharging operations.

13. In a fluid measuring apparatus in combination, a fluid supply, a measuring container operating to receive and discharge fluid, means for limiting the supply of fluid to said container upon each operation thereof, to the exact volumetric capacity of said container, a shut-off device for said supply, and adjustable means arranged to be set for shutting off said supply when the container has performed a predetermined number of receiving and discharging operations.

14. In a fluid measuring apparatus in combination, a fluid supply, a measuring container operating to receive and discharge fluid, means for limiting the supply of fluid to said container upon each operation thereof, to the exact volumetric capacity of said container, a shut-off device for said supply, a delivery chamber for receiving the discharge from said container and having an outlet passage, and means actuated by the non-delivery of fluid through said outlet for actuating said shut-off device.

15. In a fluid measuring apparatus in combination, a fluid supply, a measuring container having an inlet for receiving fluid and movable to a position for discharging its contents, an overflow chamber above said inlet for receiving the overflow therefrom, said overflow chamber having a bottom surface fitting against the upper surface of said container to act as a cut-off for said inlet when said container is moved therepast.

16. In a fluid measuring apparatus in combination, a fluid supply, a measuring container having an inlet for receiving fluid and movable to a position for discharging its contents, an overflow chamber above said inlet for receiving the overflow therefrom, said overflow chamber having a bottom surface fitting against the upper surface of said container to act as a cut-off for said inlet when said container is moved therepast, said bottom surface being wider than said inlet to completely overlap the same during said cutoff whereby the supply of fluid to said container at each receiving operation is limited to the exact volumetric capacity of said container.

17. In a fluid measuring apparatus in combination, a fluid supply, a measuring container having an inlet for receiving fluid and movable to a position for discharging its contents, an overflow chamber above said inlet for receiving the overflow from said container, holding means for said container to prevent its movement to discharging position, and float-operated means actuated by said overflow chamber for effecting the release of said holding means, said overflow chamber having a bottom surface fitting against the upper surface of said container to act as a cut-off device for said inlet when said container is moved therepast, whereby the supply of fluid to said container at each receiving operation is limited to the exact volumetric capacity of said container.

18. In a fluid measuring apparatus, the combination with a source of fluid supply of a measuring container movable from a position receiving a supply of fluid to a position for delivering the same. means for supplying fluid from said source of supply to said container until it overflows and means controlled by the overflow fluid for controlling movement of said container to position to deliver the measured quantity.

19. In a fluid measuring apparatus, the combination with a source of fluid supply, of a measuring container movable from a position receiving a fluid supply to a position to deliver the same, means for supplying fluid from said source of supply to said container until it overflows, means controlled by the overflow fluid for controlling movement of said container to position to deliver the measured quantity of fluid, and means for shutting off the fluid supply.

20. In a fluid measuring apparatus, the combination with a source of fluid supply, of a measuring container operating to receive and discharge fluid, holding means for preventing the discharging operation of said container, means for filling said container to overflowing, and means actuated by the overflow liquid for releasing said holding means, said container, when released, moving under action of the weight of the fluid therein to fluid discharging position.

21. In a fluid measuring apparatus, the combination with a source of fluid supply and a measuring container adapted to receive a definite quantity of fluid in one position and to move under gravity of the contained fluid to discharge the same, of means controlled by the fluid for insuring the filling of the container to capacity before said container can be moved to discharging position, said container when thus moving acting to cut off the supply of fluid thereto.

22. In a fluid measuring apparatus, the combination with a source of fluid supply, of a measuring container operating to receive and discharge fluid, manually settable means for predetermining the number of discharging operations of said container, and means for actuating said settable means actuated by the container on the discharging operation thereof.

23. In a fluid measuring apparatus, the combination with a source of fluid supply, of a measuring container operating to receive and discharge a fluid, a counting mechanism actuated by the container on the discharging operation thereof, and means controlled by a part of said counting mechanism for cutting off the supply of fluid to said container after a predetermined number of operations of said counting mechanism.

24. In a fluid measuring apparatus, the combination with a source of fluid supply, of a measuring container operating to receive and discharge fluid, a cut-off device for said source of supply, a delivery chamber for receiving the discharge from said container and having an outlet passage, and means actuated by an accumulation of fluid in the event of stoppage of said outlet, for actuating said cut-off device.

25. In a fluid measuring apparatus, the combination with a source of fluid supply, of a measuring container operating to receive and discharge fluid, a cut-off device for said source of supply, and a counting mechanism actuated by the container on the discharging operation thereof to actuate said cut-off device.

26. In a fluid measuring apparatus, the combination with a source of fluid supply, of a measuring container operating to receive and discharge fluid, a cut-off device for said source of fluid supply, a counting mechanism actuated by the container on the discharging operation thereof, a delivery chamber for receiving the discharge from said container and having an outlet passage, means actuated by an accumulation of fluid in the event of stoppage of said outlet for actuating said cut-off device, and means actuated by said counting mechanism after a predetermined number of operations thereof for also actuating said cut-off device.

27. In a fluid measuring apparatus, the combination with a source of fluid supply, and a measuring container for intermittently receiving and delivering a definite quantity of fluid, of means for supplying fluid from said source of supply to said container until it overflows, and a holder for the overflow, said holder and measuring container being so constructed and arranged that the excess liquid in said holder is added to the next supply to be measured.

28. In a fluid measuring apparatus, the combination with a source of fluid supply, and a measuring member for intermittently receiving and delivering a definite quantity of fluid, of means for supplying fluid from said source of supply to said member until said member overflows, a holder for the overflow, said holder and measuring member being so constructed and arranged that the excess liquid in said holder is added to the next supply to be measured, and means controlled by the overflow liquid in said holder for governing the delivery of the measured quantity.

29. In a fluid measuring apparatus, the combination with a source of fluid supply and a measuring container to receive fluid from said supply while the container is in one position and to discharge said fluid therefrom when in another position, of means controlled by the fluid for insuring the filling of the container to capacity before said container can be moved to discharging position.

30. In a fluid measuring apparatus, the combination with a source of fluid supply and a measuring container adapted to receive a definite quantity of fluid in one position and to move under gravity of the contained fluid to discharge the same, of means for holding said container in position to receive the fluid, and means outside of said container and actuated by the fluid to release said holding means to permit said container to move to discharging position.

31. In a fluid measuring apparatus, the combination with a source of fluid supply and a measuring container adapted to receive a definte quantity of fluid in one position and to move under gravity of the contained fluid to discharge the same, of means for holding said container in position to receive the fluid, means outside of said container and actuated by the fluid to release said holding means to permit said container to move to discharging position, and means controlled by said container when thus moving to cut off the supply of fluid thereto.

32. A fluid measuring apparatus having, in combination, a measuring container adapted to receive a definite quantity of fluid in one position and to move under gravity of the contained fluid to discharge the same in another position, a fluid supply providing a container filling column of fluid at the receiving position of said container in excess of the capacity of said container, and means whereby the movement of said container from receiving position effects the cutting off of the measured container-full of fluid from said column.

33. A fluid measuring apparatus having, in combination, a measuring container adapted to receive a definite quantity of fluid in one position and to move under gravity of the contained fluid to discharge the same in another position, a fluid supply providing a container filling column of fluid at the receiving position of said container in excess of the capacity of said container, means for holding said container in fluid receiving position, means governed by the excess fluid in said column for releasing said holding means, and means whereby the movement of said container from receiving position effects the cutting off of the measured container-full of fluid from said column.

Signed at New York city, N. Y., this 29th day of November, 1916.

NORMAN B. GARDINER.

Witnesses:
BEATRICE MIRVIS,
C. T. NEAL.